June 14, 1960 C. C. HERITAGE 2,940,134
DRY FELTING APPARATUS AND PROCESS
Filed Sept. 2, 1950 4 Sheets-Sheet 2

Inventor
Clark C. Heritage
by W. Bartlett Jones,
Attorney

Inventor
Clark C. Heritage
by W. Bartlett Jones,
Attorney

June 14, 1960

C. C. HERITAGE 2,940,134

DRY FELTING APPARATUS AND PROCESS

Filed Sept. 2, 1950

Inventor
Clark C. Heritage
by W. Bartlett Jones
Attorney

United States Patent Office 2,940,134
Patented June 14, 1960

2,940,134

DRY FELTING APPARATUS AND PROCESS

Clark C. Heritage, Minneapolis, Minn., assignor of one-half to Weyerhaeuser Company, a corporation of Washington, and one-half to Wood Conversion Company, St. Paul, Minn., a corporation of Delaware Filed Sept. 2, 1950, Ser. No. 182,965

21 Claims. (Cl. 19—156)

The present invention relates generally to the so-called air-laid type of fiber felts and the felting of dry fibers to form continuous felts, and more particularly to such felts formed originally with a content of finely divided solid binder, to be subsequently activated in the formed felt to effect a binding action.

In forming such a dry felt of one or more kinds of fibers and with or without other material mixed therewith, there are difficulties in producing a felt having the same relative proportions of fiber fractions and other materials as has the material fed into the operation for forming the felt. With respect to the fibrous material this results in part from a content of finer fibers which tend to escape the felting operation. In the case of other materials, such as comminuted solids and powders, there is a strong tendency for the particles to pass through the felt or portions thereof or the felt and screen where the latter is used, or in other cases the fines may be carried as fugitive solids away from the felting region, or even away from the felt after its formation. The loss of material in a continuous felting operation by filtration is further enhanced by reason of the fact that the commonly employed felting screens or other perforated members on which the felt is formed by filtration, pass more of the material before the perforations are effectively covered with the felt growing thereon, than is passed after a felt is formed. Commonly, the perforations are larger than the interstices of the felt formed over the perforations.

In order to avoid the complications resulting from loss of such fugitive material, the present invention aims to form a felt containing all of the material originally fed into the system for felting, by collecting the fugitive solids of the process and introducing them again into the system.

It is an object of the invention continuously to form a web of air-laid felt by a dry felting process without loss of material through imperfections and incompleteness in the felting step.

It is a particular object of the invention to form such an air-laid felt containing non-fibrous material which may readily escape the felt, and to collect and recirculate all the material escaping the felt.

It is an object of the invention to produce by a dry felting process an air-laid felt of uniform composition and structure by bringing the variable material which is fugitive from the felting step under control by collecting and recirculating the fugitive material.

Various other and ancillary objects and advantages of the invention will become apparent from the following description and explanation of the invention as set forth in the accompanying drawings in which.

It is to be understood that the foregoing and many other types of apparatus may be employed to carry out the process of the present invention as expressed in the appended claims.

In order to produce a continuous felt of high quality with a maximum degree of uniformity over a long period of time in a continuous process, the materials to be included in the felt must be introduced into the process at a regular rate, and then be maintained in gaseous suspension under continuing uniform conditions; and the suspension must be subjected to constant conditions for forming felts therefrom. The felting operation need not be limited to passing the suspension through a felting screen. It may take place by action of gravity under suitable conditions permitting the suspended material to fall from its gaseous vehicle and deposit as a felt on a moving conveyer. This requires apparatus of large size. The process also may be carried out in smaller sized apparatus by using felting screens and by use of greater velocity for the moving suspension. Where felting is effected by means for filtering suspended fibers with or without other materials from vehicular gas, this may be done by various combinations of super-atmospheric pressure, atmospheric pressure, and sub-atmospheric pressure to create a required differential pressure on the two sides of the screen.

In all of these methods, there is a fraction of material, usually fines, which is fugitive from the felting process. In gravity deposition fugitive solids may derive in one or two ways. For one, certain fractions of the materials are more resistant to settling and their deposition is so delayed that it is expedient to exclude the tardy particles from the felting operation by drawing them away in suspension as fugitive solids. By this invention the fugitive solids are returned to the process.

Where gravity deposition is practiced upon a moving screen, as carrier, not intended for use as a filter to aid the deposition, the mere vibration in motion sifts some of the fines from the felt carried on the screen. These may be collected and recirculated.

In the case of forming felts by filtration on a continuously moving screen or other perfoated carrier, the region of first exposure of the filter to the suspension passes an appreciable fraction of the suspended material, both fines and coarse, and as the felt grows upon the filter the fugitive material tends to be less and less until circumstances may prevent the escape of any fugitive material.

Figure 1:
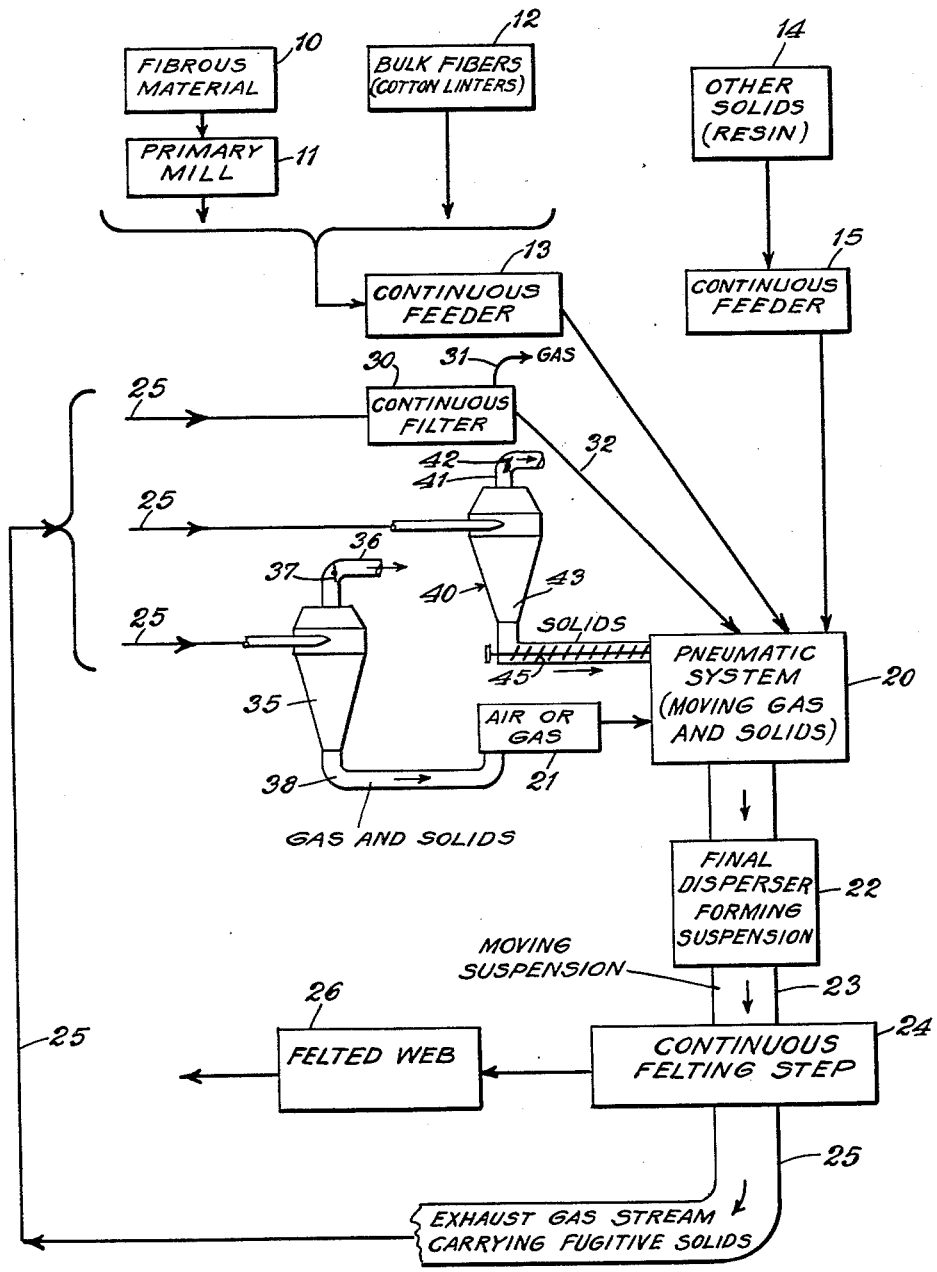
Fig. 1 is a diagrammatic representation of the process in its generic aspect.

In the drawings, Fig. 1 represents the process more or less diagrammatically in its generic aspect as it may be carried out in numerous embodiments of the process. Raw material to supply the final felt is fed continuously at a controlled rate by weight into a pneumatic system. The raw material may be available as a fluff of individual fibers, such as cotton linters, or it may be available as material requiring disintegration or defibering, such as wood chips, lap pulp, cardboard stock, waste newspaper, straw, grasses, cane and other fibrous agglomerates from which individual fibers must be freed. In the latter case, there is first employed some primary mill to individualize the fibers and provide them in suitable physical form, preferably an amassed form or fluff, for feeding into the pneumatic system. Some such mills discharge the fibers into a moving stream of air, which may be used as the supply to the pneumatic system, or which may be used to form an amassed supply to be drawn upon.

Numeral 10 indicates fibrous material to be disintegrated into fibrous form by a primary mill 11, which may be, for example, a hammer mill in which the dry fibrous material is readily reduced to a fluff of individual fibers. Numeral 12 represents an alternative supply of individualized fibers or fluff, for example, cotton linters, which may be employed without need for such a primary mill.

The fluff material 12 or its equivalent in individualized fibers from mill 11, or a gaseous suspension of the fibers, is then fed by suitable mechanism as a stream at a constant rate by weight into a pneumatic system, with or without vehicular air which functions as such in the pneumatic system. Numeral 13 represents a regulated feeding device for this purpose. Numerous pieces of equipment suitable for maintaining a constant feed are available in the market, and also well known in the art. It is to be understood that fibrous materials as from mill 11 and from supply 12 may be mixed in constant proportion prior to being fed into and out of the feeding device 13. Also, it is to be understood that in the case of mixed fibrous materials, there may be two feeders 13, for example, one from the mill 11, and another for the material 12. A fiber supply of one kind is commonly an aggregate of fractions of varying fiber size. Where mixed kinds of fibers are employed, one of them is likely to yield more fugitive fibers than another, and if such fugitive fibers should be lost from the process, the original proportion of fibers fed into the system would not obtain in the final felt. This change of proportion is likewise pronounced when the fed material includes finely divided solid binder, such as powdered pitch, moist or water-bearing starch grains, or preferably comminuted solid thermosetting resin, any one being indicated by the numeral 14.

Numeral 15 represents a suitable feeding device for providing a constant and uniform feed of some non-fibrous material 14 into the pneumatic system for admixture with the fibers and for inclusion in the felt. When material 14 is comminuted dry powdery material, it more readily escapes the felting operation than do the fibers, and in order to preserve the initially fed proportion of fiber to powder, it is an object of the present invention to recover and circulate all the fugitive material.

The pneumatic system 20 into which all of the dispersible material at a controlled rate is continuously fed, is one having a moving stream of gas, preferably air, maintained under uniform equilibrium conditions throughout the time extent of the process. Any means may be provided for introducing gas, and to facilitate explanation of the invention, numeral 21 represents a supply of gas, which may be the atmosphere, drawn upon to supply all or part of the moving gas in the pneumatic system 20.

In the system 20 the fed materials, including essentially fiber and any other materials such as the finely divided binder 14, are merely conveyed and intermingled as they are carried in the gas stream to a final disperser designated 22. This may be any suitable device which breaks up the fluff or agglomerates of material fed to it in order to individualize the fiber and other material for being carried further in the pneumatic system substantially all as individually suspended particles. The fiber disperser 22 may be a mill or other device presenting a perforated plate with means for distributing the solids over the plate, either by forcing the solids through the perforations or positioning the solids so that the moving gas carries the individual elements or particles through the plate and forms and maintains the desired suspension.

Then the suspension which is indicated at 23, is subjected to conditions inducing felting. The action may consist of expanding the suspension 23 in a large chamber so that the individual elements or particles gravitate to the bottom and deposit as a low-density felt upon a moving conveyer therein. In such case the material which is delayed in settling may be drawn off as a continuous exhaust stream containing solids which are fugitive from the permitted gravity-felting step. Where the moving conveyer is a screen, as it commonly is for mechanical advantages, some material readily sifts through the screen as a result of mechanical vibration incidental to the travel of the screen. This sifting material is collected and recirculated.

In other cases the suspension 23 may be lead to and through a continuously moving perforated felting screen by differential pressure. In such a filtration felting the major portion of the suspended solids is retained and builds up as a moving felt on the moving screen, and a minor portion of the suspended material and all of the suspending gas pass through the screen, or through the screen and the felt, as an exhaust stream containing fugitive solids.

These continuous felting steps are generically represented by the numeral 24, and the exhaust stream or streams of fugitive solids is represented by the numeral 25. The formed web 26 of the felting process 24 moves continuously away and may be variously treated as desired. For example, where the felt contains heat-activatable binder, the web may be heated and bonded with or without compression to form a variety of products of desired character.

In order to convey the fugitive solids back to the process, they are returned to the pneumatic system as a concentrate.

Since the practical methods of forming and maintaining a pneumatic system using air as the gas involve drawing air from the atmosphere at the suction side of the system, all of the air so drawn in is included in the exhaust stream 25. It is not feasible to return all of the gas stream 25 to the intake of the pneumatic system. Where one or more of the fed materials is introduced also with air, it becomes impossible to return all the air of the exhaust stream to the pneumatic system. Rather than diverting only a portion of the exhaust stream 25 back into the pneumatic system and thereby waste the fugitive solids in the portion not used, the present invention provides for treating the exhaust stream to divide it into at least one fraction which is a continuous gas stream substantially free from solids, and one or more other portions together containing all the fugitive solids, and these are returned to the system. This may be done in such a way that the solids and the gas are entirely separated one from the other so that the solids alone may be reintroduced into the system. It also may be accomplished by dividing the exhaust stream into two gaseous fractions, one of which is substantially free from solids and the other of which is much more concentrated in said solids, still in suspension, than the original exhaust stream 25.

In Fig. 1 three methods are indicated for returning the fugitive solids to the pneumatic system. Numeral 30 indicates a continuous filter of suitable form by which the exhaust stream 25 is cleansed of its entrained solids providing a continuous stream of waste gas 31 and a continuous stream of recovered solids 32 shown as being fed back directly into the pneumatic system at its intake portion 20.

The remaining two illustrated methods may be carried out with the same equipment simply by changing the adjustment thereof. However, in the drawing the equipment is represented in each case as a separate item. Numeral 35 represents a conventional type of cyclone collector into which the exhaust stream 25 is fed tangentially as indicated. At the top of the cyclone is a central exhaust conduit 36 with a control damper 37 therein. At the bottom of the inverted cone of the cyclone 35 is a conduit pipe 38. As well known, the cyclone acts centrifugally to throw suspended solids to the periphery, thereby purging the remaining gas at the center. This cleansed gas may be exhausted through the pipe 36 in amount according to the adjustment of the damper 37. Where the damper 37 is adjusted to discharge less air than is fed into the cyclone as exhaust stream 25, the remainder passes out through conduit 38 as a gas having an enriched suspension of the solids introduced. The conduit 38 is illustrated as leading to the gas supply 21 from which the concentrated stream in pipe 38 is again drawn into the pneumatic system 20, thus providing part of the gas essential thereto.

In the third illustrated method, the same or similar cyclone is shown by the numeral 40 with its discharge pipe 41 and damper 42. In this instance, the damper 42 is so adjusted that all the air entering the cyclone as exhaust stream 25 is exhausted as a solids-free stream. At the bottom of the collecting cone 43 the solids tend to accumulate and from this point they are shown being drawn off by worm screw 45 which feeds them continuously back into the pneumatic system 20.

Thus, in operation, material from one or more supplies, including feltable fiber, is fed each at a constant rate and continuously into a pneumatic system wherein the solids introduced become individually dispersed and then felted in a continuous operation to provide a continuous felt and to provide a stream of exhaust gas containing fugitive solids. The solids are then suitably separated from some or all of the vehicular gas and returned to the system for subsequent dispersion and admixture with newly introduced material and for again subjecting them to the felting operation.

By continuous operation of the process as described, unavoidable variations in conditions may take place whereby the proportion of material felted and exhausted may change. However, since the fugitive material is quickly recycled and again introduced back into the process, the operation is self-maintaining and self-correcting as to proportion, with the result that a product of high uniformity in proportion of its ingredients in accordance with the fed-in proportions may be readily obtained. Of course, the highest degree of perfection in quality of felt and in uniformity of proportion depend upon maintaining uniformity of all mechanical portions of the system, and such uniformity is, of course, intended in order to secure the maximum benefits of the present invention.

Figure 2:
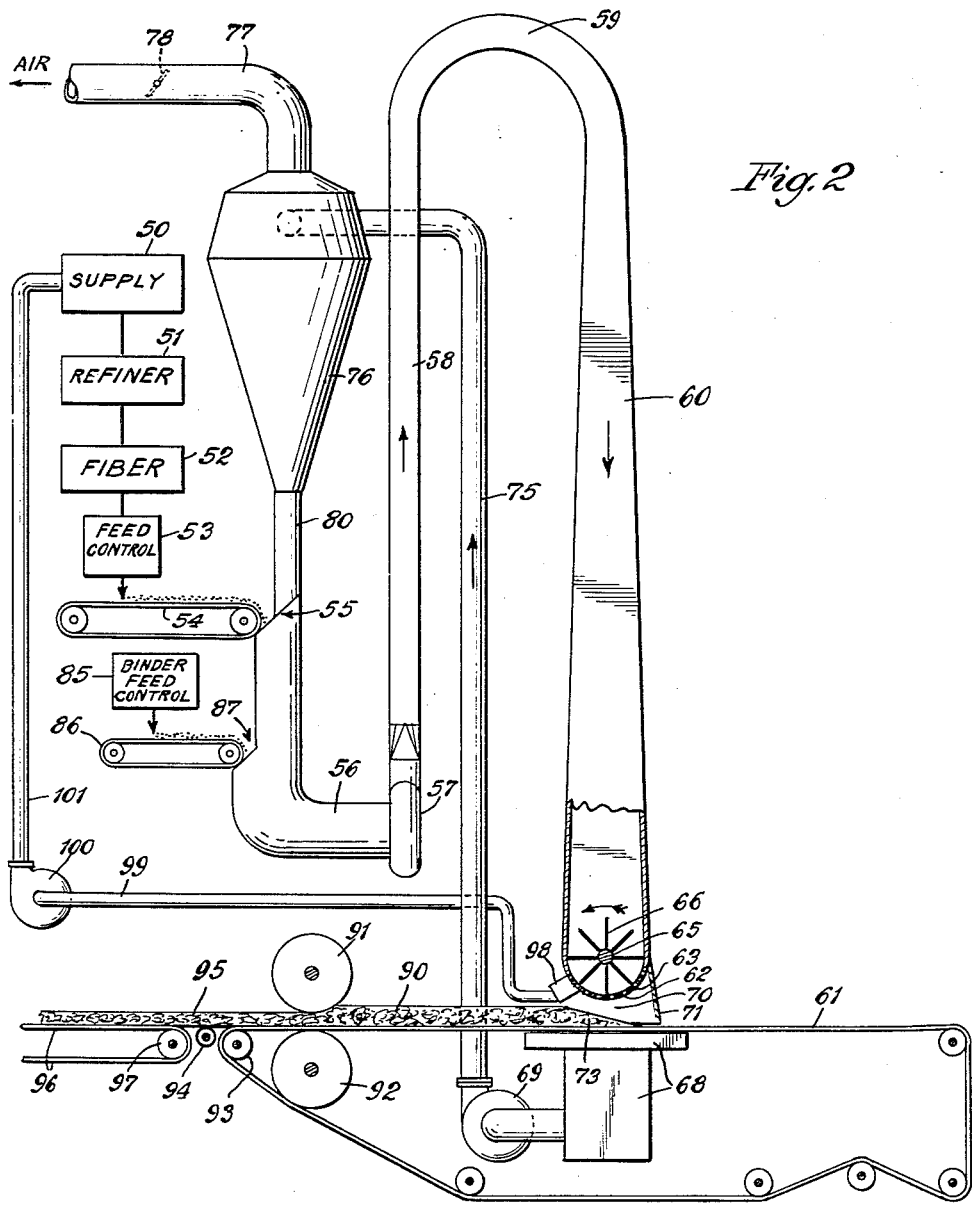
Fig. 2 shows apparatus for carrying out the process in one manner by felting from a fiber suspension under pressure onto a Fourdrinier screen having suction on the opposite side.

Fig. 2 shows one species of the process carried out by felting on one side of a screen from a suspension at super-atmospheric pressure in combination with sub-atmospheric pressure on the opposite side of the felting screen, as a result of which the felting screen may be an endless member operating at substantially atmospheric pressure.

First, there is a supply 50 of fibrous material, such as pulp sheets, or wood chips, fed to a refiner 51, which converts it to defibered form suitable for felting when adequately dispersed for such action. The fiber in dry form is represented by a supply 52, from which a feed control 53 delivers it at a constant rate by weight to a feed belt 54 carrying it into the hopper opening 55 in suction conduit 56.

The suction conduit 56 leads to a blower 57, which in operation disperses the fiber into a fast moving stream of air in an upwardly directed conduit 58, of considerable height. This conduit is extended by a goose-neck 59 for directing the stream downwardly into a long flaring stream-lined conduit 60 generally rectangular in its cross-section, and having a maximum width (vertical to the plane of the drawing) substantially the same as the width of an endless wire felting screen 61 which moves horizontally across and below the end of the conduit 60. The height and width of the conduit 60 are such as to permit nearly vertical side walls for stream-lined flow.

The end of the conduit 60 is a semi-cylindrical head 62 with perforations 63 of substantially the same size over its entire discharge area. Within the head is a co-axial rotor 65 with blades 66 which preferably have rubber edges to wipe fibers through the perforations. A speed of about 80 to 100 r.p.m. for a rotor about two feet in diameter is suitable.

Under the screen 61 and below the dispersing head 62 is a suction box 68 connected to the suction end of a blower 69 more powerful than blower 57 for handling a greater volume than blower 57, and hence drawing in air from the atmosphere about the dispersing head. Baffle plates 70 at the sides of this space and 71 at the front (over the entering screen 61) minimize disturbing effects of air currents on the felt 73 forming as shown.

The blower 69 discharges via conduit 75 into a down-draft cyclone or concentrator 76, provided with a clean-air discharge conduit 77, having adjustable damper 78, and having a bottom outlet conduit 80 for the remaining air and all the solids entering the cyclone from conduit 75, when the damper is appropriately adjusted. It is, of course, to be understood that the damper 78 may be adjusted to exhaust all the air through the damper and to discharge at the bottom outlet 80 all the solids introduced by way of the conduit 75. Said conduit 80 discharges into the opening 55 of the conduit 56, at which location atmospheric pressure obtains.

Where an ingredient other than the fiber is to be included in the formed felt 73, it may be fed into the suction conduit 56 at any place. As an example, there is shown a supply of finely divided binder, for example, thermosetting resin powder, fed by a feed control 85 to a conveyer belt 86, which discharges it into a hopper-like opening 87 in the conduit 56.

In operation, a dispersion of fiber is continuously formed and discharged from the dispersion head 62 under highly favorable conditions for uniformly felting it to a dry felted sheet, which may be three to four inches in thickness, as indicated at 90, as carried away from its place of formation. It may be densified, as by compression rolls 91 and 92, the latter being under the screen and supporting the return stretch of the screen, which, however, makes a sharper turn over idler roll 93. Adjacent the idler roll 93 is a pick-up roll 94 which carries the compressed felt 95 to a conveyer belt 96 passing over adjacent idler roll 97.

In operation of the dispersing head 62, it has been observed that the coarser particles issue first and the finer particles last. Thus, the coarseness modulus of the discharge varies progressively. When the rotor turns counter-clockwise as indicated, the stream at the right is richer in fines than at the left, and coarser particles increase in proportion and in size toward the left. One consequence is that the stream particles richer in fines, strike the bare screen 61 near the front baffle 71 and more of them tend to pass the screen. This loss may be minimized by reversing the rotor from the illustrated direction. However, since the system saves all these fines, there is no ultimate disadvantage.

Another effect is that the first deposited layer tends to be of finer texture when the rotor 65 operates as illustrated, and the top layer tends to be coarser. Another effect is a tendency to accumulate any coarse particles which may be undesirably present. It is for this reason that there is an optional suction or accumulation box 98 over the perforations where the material first discharges. The box is connected by conduit 99 to the suction end of a blower 100 which discharges via conduit 101 into the raw material supply 50. From time to time, or continuously, as may be necessary, the blower 100 may be operated to clear the box 98 of accumulated coarse particles.

Figure 3:
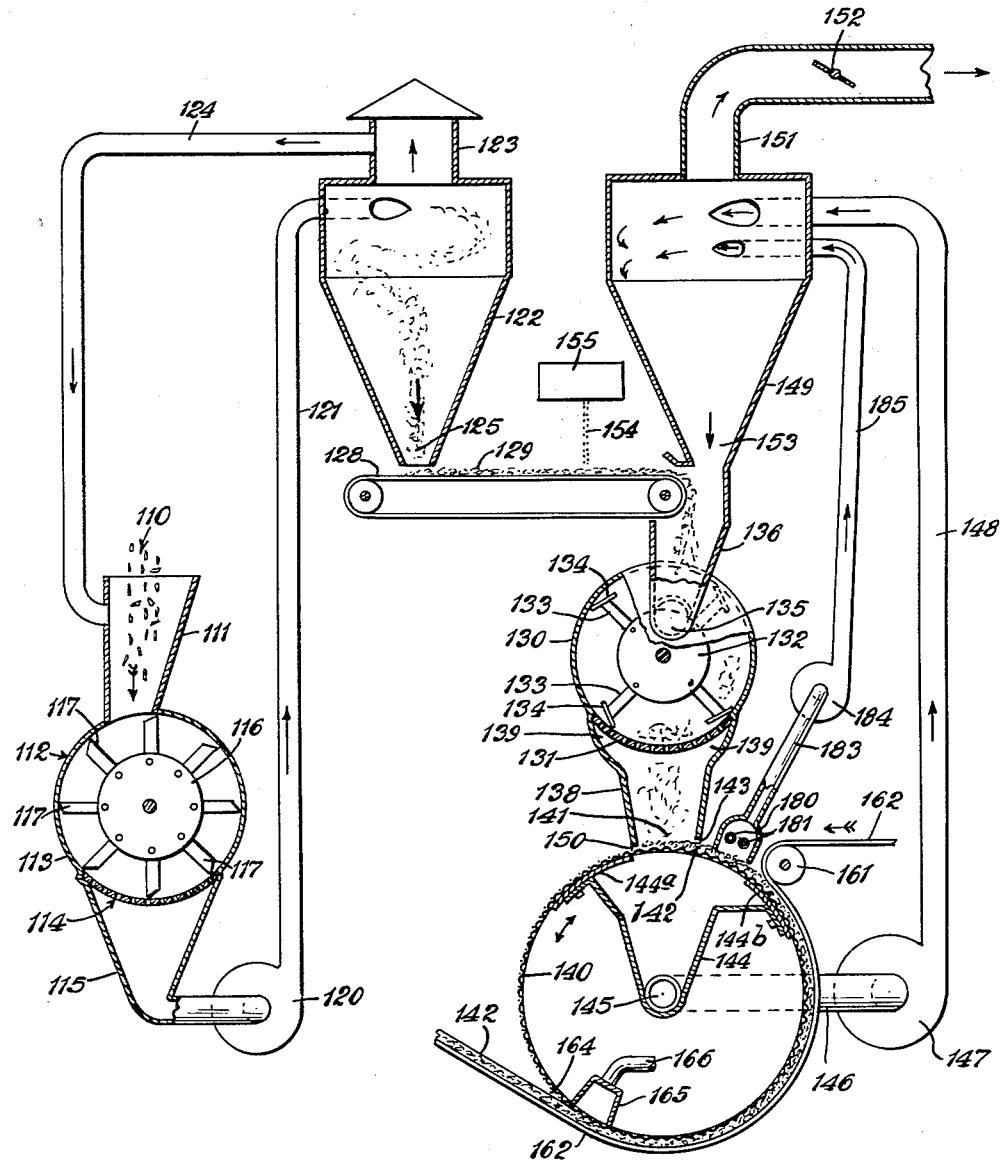
Fig. 3 shows another kind of apparatus carrying out the process by felting onto a cylinder which may be masked to provide a variety of forms of felt either as continuous webs or a continuous sequence of felted entities.

Fig. 3 is a species wherein the felting is accomplished on a cylindrical screen which may be variously masked to produce a multiplicity of continuous webs or a succession of felted units according to the unmasked screen areas.

The apparatus shown in Fig. 3 is the same as illustrated and described in my earlier application, U.S. Serial No. 156,018, filed April 14, 1950, of which application the present application is a continuation-in-part, and to which application this application is generic as to certain features of the process.

In Fig. 3, fibrous material 110, such as pulp laps or other bulk forms of fibrous material to be individualized for ultimate dispersion, is fed at a controllable rate into a hopper 111 which leads to a mill 112 of suitable character to disintegrate the supplied fibrous material into a mass of substantially individualized fibers, clotted or not, and in high concentration, preferably in the form of a fluff. The mill may be one of conventional type for the purpose, such as a hammer-mill having a cylindrical casing 113, an arcuate portion of which is perforated as indicated at 114, through which portion the disintegrated material is discharged as fiber into a receiver 115. The mill has a co-axial rotor 116 which has vanes or other means such as swinging hammers 117 so arranged that in rotation of the rotor the hammers effect disintegration of the fibrous material 110, and also movement of it through the perforated screen portion 114. Such a mill is commonly associated with means to cause a current of air to flow through it. As shown in the drawings, the receiving chamber 115 is connected tightly over the plate 114 and also connected to the suction side of a blower 120 which discharges through conduit 121, to a cyclone 122. Thus, in operation, the fibrous material 110 is disintegrated into a material which may be discharged as a fluff into said cyclone 122 along with vehicular air drawn in whole or in part from the atmosphere at the hopper 111 by action including that of the blower 120.

The cyclone 122 functions to separate air and the fiber or fluff, discharging the air upwardly through a top vent 123 for exhaust. For numerous reasons of economy, part of the air so vented through the top portion 123 may be recycled by way of conduit 124 which leads into the hopper 111. The cyclone 122 is operated so that its bottom portion 125 does not discharge air under pressure, but only the fiber which settles downwardly in its conical base, preferably as a supply of accumulated fiber of variable depth to accommodate irregularities in the feeding of fiber 110 into hopper 111. Beneath the cyclone is an endless conveyor belt 128 which gathers on it fiber 129 as the belt passes under the lower end 125 of the cyclone. Preferably the belt is operated at a controlled rate and is arranged to carry a predetermined weight of fiber in a given time, thus allowing a reserve supply to be maintained in the bottom 125 of the cyclone. The measured amount of fiber may be controlled by regulating the distance between the discharge opening 125 and the conveyor belt 128, and also by regulating the rate of travel of the belt 128.

The arrangement described permits the feed from the conveyor belt 128 of substantially individualized fibers in fluff form at a regular rate for dispersal and delivery to the felting means. The dispersal in air for felting is effected by a final disperser which may be generally of the same type as the primary disperser 113. Modifications, however, are indicated. As a final disperser there is shown a cylindrical casing 130 on a horizontal axis, having an arcuate extent of its periphery, namely about 90°, perforated as a screen 131, through which fibers are urged by operation of the disperser. There is an agitator in the casing, preferably provided as a co-axial rotor 132 which may operate at high speed, and thereby act as a sort of fan or blower to induce a flow of air outwardly through the casing to discharge at super-atmospheric pressure through the screen 131. In the event the agitator does not operate as a blower fan, for example when the rotor 132 is merely oscillated, other means may be employed to create the moving current of air, such as a blower, preferably on the intake side of the casing 130. The agitator or rotor 132 carries fixed or radial swinging blades 133 on which there are suitable heads, for example rubber pads 134, which rub the fluff 129 against the inside of the casing 130 to individualize it. The stream of air flowing through the casing carries the individualized fibers away through the ports in plate 131. The mill may be fed laterally, as at one vertical wall of the casing wherein an opening 135 is indicated, or longitudinally or facewise, if means for obtaining the desired flow of air and fluff is provided as mentioned above. Leading to the opening 135 is a hopper 136 into which the conveyor belt 128 discharges its load of fluff.

The peripheral extent of the screen 131 in part predetermines the direction and character of the discharged air-suspension of fiber. The next step is to pass the stream of air and fiber through a screen to form a felt. This place of formation is called herein a depositing area, and its location predetermines the path of a moving screen on which the felt is formed. To assist the deposition, suction is applied under the screen, whereas the air stream in the depositing area is at super-atmospheric pressure. The suction capacity is such as to take in all the air constituting the current which carries fibers into the depositing area, in order to prevent escape of fibers and air from the depositing area into the atmosphere. Consequently the area of the screen at which suction is applied includes the entire depositing area within its bounds, and preferably the suction area is greater than the depositing area to draw in atmospheric air as a sort of envelope to house the air suspension.

To these ends, the screen 131 of the final disperser may be placed very close to the depositing area, or be remote from it when suitable means is employed to confine the current of air discharged at the screen 131 and direct it toward or to the depositing area. Because of the wide angle comprehended by the particularly illustrated screen 131, such a confining means is employed in the apparatus of the drawings. Since the distance traversed from the screen to the depositing area is also preferably short, the said confining means is extended as a sort of conduit or nozzle substantially to the depositing area.

On the external face of the disperser 130 is a collecting hood or nozzle 138 having a special construction. It is so formed as to have two diverging horn-like sections 139, leading to the edges of the perforated plate 131 of the disperser, thus to gather the air suspension coming through screen 131 and narrowing the passageway for it so that the velocity of the discharge suspension increases as it moves away from the screen. By this means clotting is minimized by a tendency to move each fiber faster than each following fiber where there are the side walls of the horns tending to induce clotting. This constriction of the cross-section of the stream is carried to the depositing area where the felt is formed, by the slight taper of the nozzle 138.

The felting means is provided as a cylindrical screen of which a screen periphery 140 moves at a regular rate through a depositing area 141 which in the illustrated embodiment is the orifice of the nozzle 138. The character of the screen may be greatly modified as will be described hereinafter, but for simplification of the description it may be said that the screen 140 in Fig. 3 is entirely perforated without obstructing areas. Thus, on the screen 140 a continuous web may be formed having a width from edge to edge of the orifice of nozzle 138. Such a web is indicated by the numeral 142 as it leaves the depositing area 141 passing under the edge 143 of the nozzle 138.

Associated with the screen 140 is a suction box beneath the depositing area 141 as indicated by the numeral 144. The exposable area of the suction box is preferably variable, and at its maximum lies outside of and encompasses the depositing area, with reference more particularly to the peripheral directions, than to the lateral bounds. Arcuate dampers 144a and 144b are adjustable to control the peripheral dimension of the suction opening.

The suction box 144 connects by suitable and well-known structure through the axle 145 to a suction conduit 146 leading to the intake of a blower 147 which discharges via conduit 148 to a down-draft cyclone 149. The blower 147 is operated so that it tends to draw in more air through the suction box than is supplied to the depositing area 141 through nozzle 138 by the operation of disperser 139, that is, at least all the air in nozzle 138, and preferably an additional amount from the atmosphere. As a result the upper side of the depositing area is at super-atmospheric pressure, while the lower side within the cylinder 140 is at sub-atmospheric pressure. The consequence is that the felting zone itself is at substantially atmospheric pressure, thus to facilitate mechanical construction and operation. By operation to draw in exactly the same amount of air into suction box 144 as flows to the depositing area from the disperser 130, no leakage of suspended fibers from the nozzle to the atmosphere will result. However, such a balance is difficult for practical management and it is therefore preferred that the blower 147 be operated to draw in some air from the atmosphere at the edges of the depositing zone, for example at the edges of the dampers 144a and 144b when positioned to permit it. In the apparatus of the drawing the damper 144a is very close to the nozzle edge 150.

As is well known in producing fiber in the manner described there is a fraction of fines which tends to pass through the felt and the felting screen to enter the exhaust system, comparable to the fibrous content in the white water in making paper on conventional papermaking machines. Since the present apparatus and process may also be operated to include material other than fiber, for example, finely divided binder, most commonly a dry resin powder, to serve as a bond, later described, some of this binder will also escape. Being frequently the more expensive component of the felt to be formed, as is a resin powder, it must be used in fine subdivision for efficiency. This enhances loss of it into the exhaust, and makes more important the necessity to save the solid entrained components of the exhaust. This is effected in the cyclone 149.

Cyclone 149 is of the same general type as the cyclone 122, but its operation is somewhat different. Cyclone 149 vents to the atmosphere by way of conduit 151 at the top, which has an adjustable damper 152. Changing the set of the damper controls the amount of air discharged via vent 151, and compels any remainder to escape through the bottom 153 of the cyclone 149. The damper 152 may be adjusted to exhaust all the air received by the cyclone and to drop to its bottom all the solids. In operation the cyclone thus effects a separation of the exhaust stream in conduit 148 into at least two portions, one of which is clean air and the other of which may be air enriched with the entrained fines from the exhaust. This enriched portion, or the solids alone, escapes at the bottom 153 of the cyclone and from there it discharges or is conveyed into the hopper 136 alongside the infed fluff 129. Thus, recycling of the fines is effected and there is no loss of material.

The processing of material by the apparatus described calls for a fine adjustment in proportion between fiber and other material, for example, dry resin powder, and where continuous uniformity in proportion is desired in the final felt 142, it is only necessary to regulate the feed of such materials properly to the disperser. The non-fibrous material may be fed in at hopper 111, or at hopper 136 or at any intermediate location. Numeral 155 represents a controlled feeder dropping binder 154 onto belt 128. In continuous operation including the recycling of the fines, the original fed proportion is constantly maintained without adverse effect resulting from the escape of fines through the filtering screen into the exhaust system.

As illustrated the nozzle 138 discharges onto the top of the rotating cylinder 140 so that action of gravity supplements the felted union of the felt to the screen to hold the formed felt 142 onto the cylinder. Before the felt 142 has an opportunity to become detached, a web of sheet material is brought to the face of the felt and combined with it by facial engagement for travel therewith. Thus, as the cylinder rotates, the felt may be held firmly to the cylinder by maintaining contact of the web with the cylinder. The web so introduced may vary in structure and in function. For example, it may merely be a transfer means in the form of an endless belt brought to the cylinder near the top and removed near the bottom at a position where it underlies the felt so that it is merely a vehicle to carry the felt away from the cylinder. The web may be a sheet of paper which is to remain with the formed felt, for example as a liner therefor in some subsequent combination structure. The web may be brought to the face of the felt with active or activatable adhesive applied interfacially, for example by applying such adhesive to the appropriate face of the web.

As shown there is a roll 161 near the top of the cylinder, over which passes a web of material indicated by the numeral 162. The roll may press upon the felt 142 or be spaced from it, serving primarily to position the sheet 162 so that it will wrap around the convex surface below it as presented by the felt on the cylinder. Where the web 162 bears active adhesive, as above mentioned, it is preferred that the roll 161 press upon the felt 142 in order to exert pressure for adhesive engagement at the interface.

At the bottom of the cylinder 140 the relationship of web 162 to felt 142 is such that the web underlies the felt where it may serve as a carrier to support the felt in leaving the cylinder as indicated by the numeral 164. At this point the felt 142 rests on the web or sheet 162 and the two move upwardly away, for example, at an angle for subsequent processing. In the event that the felt 142 adheres to the screen 140, it may be forced away from the screen by air pressure. For this purpose there is shown a pressure chamber 165 fed by compressed air in pipe 166. Chamber 165 opens to the inner face of the screen to blow the felt off the screen, and incidentally clean the screen. Where the felt is continuous as shown in Fig. 3, the felted strength is commonly sufficient to peel the felt from the screen without the necessity to blow it from initial contact position. However, where the felt formed may be a separate entity, and not a continuous strip, as would result from use of crossing masking bands on cylinder 140, it is desirable to assist the detachment by use of compressed air. This is especially true when the said felted entity is not adhesively united to sheet 162.

Where the mat 142 is such that it contains a bonding agent, for example in the form of resin powder, which may be activated to thermoset adhesion, it is permitted that the web 162 be a screen through which and through the felt, hot air may be passed to effect heating and bonding rapidly and without delay which would result from the transfer of heat conductively.

Where masked areas are used on the cylinder, fiber which may deposit thereon should be removed. Mechanism for this is shown, which removes the material and recycles it along with fines escaping into cylinder 140. Over the mat leaving the depositing area is a hood 180 extending lengthwise of the cylinder 140. Within the hood are a variable number of compressed air pipes 181 provided with openings to serve as air jets, which openings are variably located at positions to blow air onto the masked areas of the cylinder. The operation of the jets to discharge air is continuous or intermittent, but under control, according to the timing necessary to function over masked areas. Simple mechanical means in the nature of an air valve and a control therefor associated with the turning of the cylinder, are readily applicable to control the air in each pipe 181. The collecting hood 180 is connected by conduit 183 to the suction side of a small blower 184 which discharges the exhausted material by a conduit 185 into the cyclone 149. The suction exerted by hood 180 is sufficient to draw air into the hood while the jets are operating to prevent blowing out and loss of fiber and other content.

Figure 4:
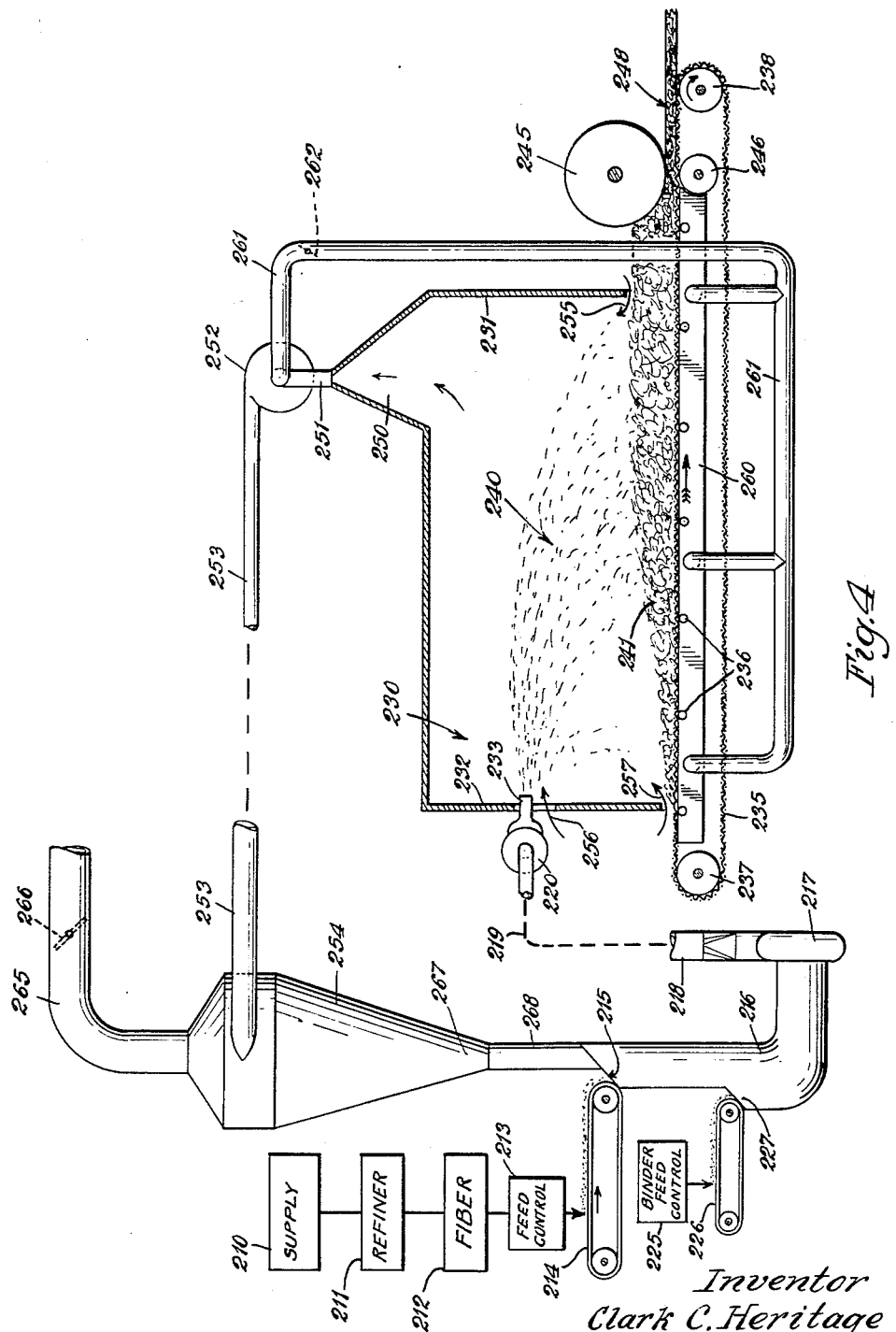
Fig. 4 shows how the process may be carried out in what is commonly known as gravity deposition chambers.

Fig. 4 shows how the process may be applied to gravity deposition. Ordinarily, gravity deposition is effected by letting fibers fall from an air suspension onto a traveling conveyer. For a high rate of production of mats so formed, there is a tendency for some fibers to escape the felting action, and additionally, as a result of the speed of the traveling conveyer when it is a screen, there is vibration and agitation causing fibers or other content deposited on the conveyer to sift through the perforations thereof. According to the present invention, the atmosphere above and below the traveling conveyer is confined, as in a chamber, and is therein subjected to a mild suction in order to collect fugitive fines and fibers and other material for recirculating the same in accordance with the present invention.

In Fig. 4 the means and method of feeding fiber and other material are illustrated in substantially the same manner as already described in connection with Fig. 2. The numeral 210 is a supply of fibrous material as described, fed to a refiner 211 which converts it to defibered form suitable for felting when adequately dispersed. The resulting fiber in dried form is indicated by the numeral 212. Such fiber is fed by a controlled feeder 213 to an endless feed belt 214 which discharges the fed fiber into a hopper 215 located in a suction conduit 216.

Suction conduit 216 leads to a blower 217 which in operation discharges a fiber suspension in a conduit 218, shown as connecting by dotted line 219 to dispersing means 220, for example, one like the disperser 130 described in connection with Fig. 3.

The numeral 225 indicates a supply of finely divided binder which also may be fed at a controlled rate onto an endless feeding belt 226 which discharges the same into a hopper 227 located also in the suction conduit 216. Thus, by the controlled feed through the belts 214 and 226, respectively, of fiber and binder when the latter is used, there is fed into a stream a fixed proportion of two different ingredients. This proportion is maintained in the resulting mat by practice of the present invention despite the losses which commonly occur as a result of fugitive material escaping the felting process or the felted mat.

In Fig. 4 there is shown a gravity deposition chamber generally designated 230. In the drawings this chamber is disproportionately small with respect to other pieces of equipment indicated, but this is merely for convenience of illustration. The use of dotted lines connecting the disproportionate parts is noted. The deposition chamber is commonly very high and very long having a front wall 231 with an opening at the bottom through which the formed mat is discharged. There is a back wall 232 with an opening in it through which the fibers are injected as by means of one or more of dispersers 220 each with its nozzle 233. As the chamber is made wider the number of such dispersers alined horizontally is increased. At the bottom of the chamber is the upper stretch of an endless screen 235 supported within the chamber on numerous rolls 236, and at the ends passing over return rolls 237 and 238. The lines generally designated 240 refer to a spreading region of one or more streams of injected solids including fiber and optional binder which are dispersed into the chamber and which in falling form a mat indicated by the numeral 241 on the conveyer 235. Outside the chamber the conveyer with mat thereon passes through compression means illustrated by but one pair of squeeze rolls 245 and 246 to compress the mat 241 to any suitable higher density as mat 248.

At the top of the chamber 230, preferably at the forward end thereof, there is a collection dome 250 tapering into a suction conduit 251 of a suction fan 252 which discharges by conduit 253 into a down-draft cyclone 254, comparable to the cyclone 76 in Fig. 2. By this means a slight suction is maintained at the openings into the chamber, as at the front wall indicated by the arrow 255, and at the rear wall indicated by the arrows 256 and 257. The fine material which tends most to resist gravity deposition and float in the air is thus drawn out of the chamber for recirculation.

Beneath the conveyer screen 237 on which the mat is formed there is a suction box 260 extending beyond the two ends of the depositing chamber, and at the discharge end of such chamber extending to the bottom compression roll 246. The suction box is connected by a conduit 261 tapped into it at various locations, which conduit leads to the suction conduit 251 of the fan 252. A damper 262 in said conduit serves to vary the extent of suction exerted under the forming wire 235.

In operation, the screen's increased speed of travel tends more to jiggle it as it moves through the chamber on the supporting rolls 236. This leads to sifting of fine material through the mat and the wire, as fugitive material to be collected. It is noted that mats formed by differential pressure as in Figs. 2 and 3, are more dense, and that as the impact of fibers in felting is lessened, the felt formed is lower in density. Hence, a mat formed by gravity deposition is of low density and very open and loose, being susceptible to loss of material therefrom by simple mechanical vibration. The very act of compressing such a low density mat as by one or more sets of compression rolls 245 and 246 also leads to additional loss of fines. It is for this reason that suction box 260 is carried forward to the lower compression roll 246.

All the collected fines and air discharged by way of the conduit 253 into the cyclone 254 are separated by functioning of the cyclone as already explained. The cyclone has an exhaust conduit 265 with controlled damper 266 therein for solids-free air discharged thereby. The conical bottom 267 of the cyclone discharges either solids, or air enriched with solids, according to the adjustment of the damper 266, into a conduit 268 which empties into the hopper 215. At this point the fugitive solids recovered from the depositing chamber begin their journey of recirculation.

From the foregoing it will be obvious that the process may be carried out in a variety of ways and by many arrangements of equipment, all contemplated as falling within the scope of the appended claims.

I claim:

1. The method of felting which comprises providing and maintaining a continuous feeding stream of air drawn in part at least from the atmosphere, continuously distributing into said feeding stream dispersible material including a predominance of substantially individualized dry feltable fibers, whereby to form a continuous feeding stream of suspended material, separating a substantial portion of the suspended material from the carrying air by felting a fiber mat from said feeding stream onto one face of a moving foraminous member normally exposed to the atmosphere except at a depositing region traversed thereby in which region said felt is formed, providing and maintaining a continuous exhaust stream of air at greater capacity of air than in said feeding stream by creating sub-atmospheric pressure on the other side of said foraminous member at an area including the area of the said depositing region, the air in said exhaust stream including all the air of said feeding stream after separation from the material in the felt and including additional air drawn from the atmosphere at the regions bounding the depositing area, whereby the exhaust stream contains all the suspended material escaping the felting action, continuously dividing said exhaust stream into a substantially solids-free air fraction and a concentrate of solids, and continuously returning the concentrate of solids to said feeding stream.

2. The method of felting which comprises providing and maintaining a continuous feeding stream of air drawn in part at least from the atmosphere, continuously distributing into said feeding stream dispersible material including a predominance of substantially individualized dry feltable fibers, whereby to form a continuous feeding stream of suspended material, separating a substantial portion of the suspended material from the carrying air by felting a fiber mat from said feeding stream onto one face of a moving foraminous member normally exposed to the atmosphere except at a depositing region traversed thereby in which region said felt is formed, providing and maintaining a continuous exhaust stream of air at greater capacity of air than in said feeding stream by creating sub-atmospheric pressure on the other side of said foraminous member at an area including the area of the said depositing region, the air in said exhaust stream including all the air of said feeding stream after separation from the material in the felt and including additional air drawn from the atmosphere at the regions bounding the depositing area, whereby the exhaust stream contains all the suspended material escaping the felting action, continuously dividing said exhaust stream into a substantially solids-free air fraction and a continuous air stream fraction more concentrated in solids than said exhaust stream, and utilizing said solids-containing fraction as part of the air supply for said feeding stream.

3. The method of felting which comprises providing and maintaining a continuous feeding stream of air drawn in part at least from the atmosphere, continuously distributing into said feeding stream dispersible material including a predominance of substantially individualized dry feltable fibers, whereby to form a continuous feeding stream of suspended material, separating a substantial portion of the suspended material from the carrying air by directing said feeding stream onto one face of a moving foraminous member normally exposed to the atmosphere except at a depositing region traversed thereby and forming in said region a felt and passing all the vehicular air through said member, providing and maintaining a continuous exhaust stream of air at greater capacity of air than in said feeding stream by creating sub-atmospheric pressure on the other side of said foraminous member at an area including the area of the said depositing region, the air in said exhaust stream including all the air of said feeding stream and including additional air drawn from the atmosphere at the regions bounding the depositing area, whereby the exhaust stream contains all the suspended material escaping the felting action, continuously dividing said exhaust stream into a substantially solids-free air fraction and a concentrate of solids, and continuously returning the concentrate of solids to said feeding stream.

4. The method of felting which comprises providing and maintaining a continuous feeding stream of air drawn in part at least from the atmosphere, continuously distributing into said feeding stream dispersible material including a predominance of substantially individualized dry feltable fibers, whereby to form a continuous feeding stream of suspended material, separating a substantial portion of the suspended material from the carrying air by directing said feeding stream onto one face of a moving foraminous member normally exposed to the atmosphere except at a depositing region traversed thereby and forming in said region a felt and passing all the vehicular air through said member, providing and maintaining a continuous exhaust stream of air at greater capacity of air than in said feeding stream by creating sub-atmospheric pressure on the other side of said foraminous member at an area including the area of the said depositing region, the air in said exhaust stream including all the air of said feeding stream and including additional air drawn from the atmosphere at the regions bounding the depositing area, whereby the exhaust stream contains all the suspended material escaping the felting action, continuously dividing said exhaust stream into a substantially solids-free air fraction and a continuous air stream fraction more concentrated in solids than said exhaust stream, and utilizing said solids-containing fraction as part of the air supply for said feeding stream.

5. The method of felting which comprises providing and maintaining a continuous feeding stream of air drawn in part at least from the atmosphere, continuously distributing into said feeding stream dispersible material including a predominance of substantially individualized dry feltable fibers and including finely divided solid binder therefor, whereby to form a continuous feeding stream of suspended material, separating a substantial portion of the suspended material from the carrying air by felting a fiber mat from said feeding stream onto one face of a moving foraminous member normally exposed to the atmosphere except at a depositing region traversed thereby in which region said felt is formed, providing and maintaining a continuous exhaust stream of air at greater capacity of air than in said feeding stream by creating sub-atmospheric pressure on the other side of said foraminous member at an area including the area of the said depositing region, the air in said exhaust stream including all the air of said feeding stream after separation from the material in the felt and including additional air drawn from the atmosphere at the regions bounding the depositing area, whereby the exhaust stream contains all the suspended material escaping the felting action, continuously dividing said exhaust stream into a substantially solids-free air fraction and a concentrate of solids, and continuously returning the concentrate of solids to said feeding stream.

6. The method of felting which comprises providing and maintaining a continuous feeding stream of air drawn in part at least from the atmosphere, continuously distributing into said feeding stream dispersible material including a predominance of substantially individualized dry feltable fibers and including finely divided solid binder therefor, whereby to form a continuous feeding stream of suspended material, separating a substantial portion of the suspended material from the carrying air by felting a fiber mat from said feeding stream onto one face of a moving foraminous member normally exposed to the atmosphere except at a depositing region traversed thereby in which region said felt is formed, providing and maintaining a continuous exhaust stream of air at greater capacity of air than in said feeding stream by creating sub-atmospheric pressure on the other side of said foraminous member at an area including the area of the said depositing region, the air in said exhaust stream including all the air of said feeding stream after separation from the material in the felt and including additional air drawn from the atmosphere at the regions bounding the depositing area, whereby the exhaust stream contains all the suspended material escaping the felting action, continuously dividing said exhaust stream into a substantially solids-free air fraction and a continuous air stream fraction more concentrated in solids than said exhaust stream, and utilizing said solids-containing fraction as part of the air supply for said feeding stream.

7. The method of felting which comprises providing and maintaining a continuous feeding stream of air drawn in part at least from the atmosphere, continuously distributing into said feeding stream dispersible material including a predominance of substantially individualized dry feltable fibers and including finely divided solid binder therefor, whereby to form a continuous feeding stream of suspended material, separating a substantial portion of the suspended material from the carrying air by directing said feeding stream onto one face of a moving foraminous member normally exposed to the atmosphere except at a depositing region traversed thereby and forming in said region a felt and passing all the vehicular air through said member, providing and maintaining a continuous exhaust stream of air at greater capacity of air than in said feeding stream by creating sub-atmospheric pressure on the other side of said foraminous member at an area including the area of the said depositing region, the air in said exhaust stream including all the air of said feeding stream and including additional air drawn from the atmosphere at the regions bounding the depositing area, whereby the exhaust stream contains all the suspended material escaping the felting action, continuously dividing said exhaust stream into a substantially solids-free air fraction and a concentrate of solids, and continuously returning the concentrate of solids to said feeding stream.

8. The method of felting which comprises providing and maintaining a continuous feeding stream of air drawn in part at least from the atmosphere, continuously distributing into said feeding stream dispersible material including a predominance of substantially individualized dry feltable fibers and including finely divided solid binder therefor, whereby to form a continuous feeding stream of suspended material, separating a substantial portion of the suspended material from the carrying air by directing said feeding stream onto one face of a moving foraminous member normally exposed to the atmosphere except at a depositing region traversed thereby and forming in said region a felt and passing all the vehicular air through said member, providing and maintaining a continuous exhaust stream of air at greater capacity of air than in said feeding stream by creating sub-atmospheric pressure on the other side of said foraminous member at an area including the area of the said depositing region, the air in said exhaust stream including all the air of said feeding stream and including additional air drawn from the atmosphere at the regions bounding the depositing area, whereby the exhaust stream contains all the suspended material escaping the felting action, continuously dividing said exhaust stream into a substantially solids-free air fraction and a continuous air stream fraction more concentrated in solids than said exhaust stream, and utilizing said solids-containing fraction as part of the air supply for said feeding stream.

9. The method of felting which comprises providing and maintaining a continuous feeding stream of air drawn in part at least from the atmosphere, continuously distributing into said feeding stream dispersible material including a predominance of substantially individualized dry feltable fibers, whereby to form a continuous feeding stream of suspended material, separating a substantial portion of the suspended material from the carrying air by directing said feeding stream at superatmospheric pressure onto one face of a moving foraminous member normally exposed to the atmosphere except at a depositing region traversed thereby and forming in said region a felt and passing all the vehicular air through said member, providing and maintaining a continuous exhaust stream of air at greater capacity of air than in said feeding stream by creating subatmospheric pressure on the other side of said foraminous member at an area including the area of the said depositing region, the air in said exhaust stream including all the air of said feeding stream and including additional air drawn from the atmosphere at the regions bounding the depositing area, whereby the exhaust stream contains all the suspended material escaping the felting action, continuously dividing said exhaust stream into a substantially solids-free air fraction and a concentrate of solids, and continuously returning the concentrate of solids to said feeding stream.

10. The method of felting which comprises providing and maintaining a continuous feeding stream of air drawn in part at least from the atmosphere, continuously distributing into said feeding stream dispersible material including a predominance of substantially individualized dry feltable fibers, whereby to form a continuous feeding stream of suspended material, separating a substantial portion of the suspended material from the carrying air by directing said feeding stream at superatmospheric pressure onto one face of a moving foraminous member normally exposed to the atmosphere except at a depositing region traversed thereby and forming in said region a felt and passing all the vehicular air through said member, providing and maintaining a continuous exhaust stream of air at greater capacity of air than in said feeding stream by creating sub-atmospheric pressure on the other side of said foraminous member at an area including the area of the said depositing region, the air in said exhaust stream including all the air of said feeding stream and including additional air drawn from the atmosphere at the regions bounding the depositing area, whereby the exhaust stream contains all the suspended material escaping the felting action, continuously dividing said exhaust stream into a substantially solids-free air fraction and a continuous air stream fraction more concentrated in solids than said exhaust stream, and utilizing said solids-containing fraction as part of the air supply for said feeding stream.

11. The method of felting which comprises providing and maintaining a continuous feeding stream of air drawn in part at least from the atmosphere, continuously distributing into said feeding stream dispersible material including a predominance of substantially individualized dry feltable fibers and including finely divided solid binder therefor, whereby to form a continuous feeding stream of suspended material, separating a substantial portion of the suspended material from the carrying air by directing said feeding stream at superatmospheric pressure onto one face of a moving foraminous member normally exposed to the atmosphere except at a depositing region traversed thereby and forming in said region a felt and passing all the vehicular air through said member, providing and maintaining a continuous exhaust stream of air at greater capacity of air than in said feeding stream by creating sub-atmospheric pressure on the other side of said foraminous member at an area including the area of the said depositing region, the air in said exhaust stream including all the air of said feeding stream and including additional air drawn from the atmosphere at the regions bounding the depositing area, whereby the exhaust stream contains all the suspended material escaping the felting action, continuously dividing said exhaust stream into a substantially solids-free air fraction and a concentrate of solids, and continuously returning the concentrate of solids to said feeding stream as a part of the supply therefor.

12. The method of felting which comprises providing and maintaining a continuous feeding stream of air drawn in part at least from the atmosphere, continuously distributing into said feeding stream dispersible material including a predominance of substantially individualized dry feltable fibers and including finely divided solid binder therefor, whereby to form a continuous feeding stream of suspended material, separating a substantial portion of the suspended material from the carrying air by directing said feeding stream at superatmospheric pressure onto one face of a moving foraminous member normally exposed to the atmosphere except at a depositing region traversed thereby and forming in said region a felt and passing all the vehicular air through said member, providing and maintaining a continuous exhaust stream of air at greater capacity of air than in said feeding stream by creating sub-atmospheric pressure on the other side of said foraminous member at an area including the area of the said depositing region, the air in said exhaust stream including all the air of said feeding stream and including additional air drawn from the atmosphere at the regions bounding the depositing area, whereby the exhaust stream contains all the suspended material escaping the felting action, continuously dividing said exhaust stream into a substantially solids-free air fraction and a continuous air stream fraction more concentrated in solids than said exhaust stream, and utilizing said solids-containing fraction as part of the air supply for said feeding stream.

13. A device of the character described comprising a movable foraminous filtering screen in part defining a bat-forming space, means for continuously moving said screen to carry away a bat formed thereon, a vacuum chamber for withdrawing air through said screen, a circulatory air convection system leading from said vacuum chamber and comprising a terminal delivery member directed into the bat-forming space, said air convection system including a cyclone, a fan taking air from the delivery end of the cyclone and between the cyclone and said member, means for delivering fiber into the air admitted to said fan from the cyclone, and at least one additional fan between said vacuum chamber and said cyclone, both of said fans being provided with means operating them in a direction to propel air through said system, the said cyclone having an outlet normally functioning for the escape of air.

14. A device of the character described comprising a bat-forming chamber having a movable foraminous filtering screen, means for continuously moving said screen to carry away a bat formed thereon, a delivery member arranged to discharge into said chamber, a convection fan having its delivery end connected with said member, a fiber supply with which the inlet to said fan communicates, a cyclone having a tangential inlet and a first passage communicating with the atmosphere and a second passage communicating with said fan inlet, a second fan having its delivery end communicating with the tangential inlet of the cyclone, and vacuum box means associated with said screen of the bat-forming chamber and with which the inlet of said second fan communicates.

15. In a device of the character described, the combination with a bat-forming chamber comprising a movable foraminous filtering screen, of means for continuously moving said screen to carry away a bat formed thereon, a pneumatic conveyor discharging into said chamber and comprising a fan and means for supplying fiber to the air set in motion by said fan, together with a vacuum box connected with said screen and provided with air evacuating means for withdrawing air from said bat-forming chamber through said screen, and separating means for dividing exhaust air from said evacuating means into a solids-free air stream and the remainder, and a connection from said separating means for carrying said remainder into said pneumatic conveyer.

16. The method of making a uniform fibrous web comprising the steps of maintaining an excess of dispersed material including essentially separated air entrained feltable fibers on one side of a foraminous surface and with the air under positive pressure whereby both fibers and air are caused to pass in substantially uniform concentrations through the foramens, drawing air through and said fibers onto a moving surface having relatively small foramens by maintaining a pressure below atmosphere on the outgoing side thereof whereby the fibers are deposited on the ingoing side as an interfelted mass, maintaining the space between the surfaces open to the atmosphere, the air drawn through said moving surface consisting of a minor fraction from the atmosphere and a major fraction comprising all the air from the foraminous surface, whereby a slight inflow of air occurs from the surrounding atmosphere into and through the moving surface to prevent fibers from being blown out into the atmosphere and to effect an air-confined column of flowing air and fibers from the foraminous surface to the moving surface, dividing the material passing through said moving surface into the region of subatmospheric pressure on said outgoing side into a substantially solids-free air fraction and a solids residue, mixing said residue with air from the atmosphere, and conveying the resulting mixture to the region of said positive pressure on said one side of said foraminous surface.

17. The method of producing a fibrous structure comprising conveying suspended solids predominating in individualized feltable fibers through a foraminous first wall by a gaseous medium travelling at high velocity successively through the first wall and a foraminous second wall, closely spaced from the first wall and in sufficient volume to prevent excessive contact between fibers as they travel between the first and second wall, the foramens or openings through the first wall being dimensioned to permit passage of said feltable fibers and particles of said suspended solids smaller than said feltable fibers, and the foramens or openings through the second wall being dimensioned so that it will retain feltable fibers on its surface and so that it is capable of passing at least some of said smaller particles, constantly preventing fibers from being collected on the first wall to enable all said gaseous medium to pass through both walls, dividing the material leaving the discharge side of the second wall into a solids-free gaseous fraction and a solids-containing fraction, mixing at least the solids of said solids-containing fraction with air from the atmosphere, and conveying the resulting mixture to said foraminous first wall as part of said suspended solids for said gaseous medium.

18. The method of producing a fibrous structure comprising conveying suspended solids predominating in individualized feltable fibers through a foraminous first wall by vehicular air leaving said wall at superatmospheric pressure and travelling at high velocity into a region of subatmospheric pressure by movement to and through a foraminous second wall closely spaced from the first wall, the vehicular air being in sufficient volume to prevent excessive contact between fibers as they travel between the first and second wall, the foramens or openings through the first wall being dimensioned to permit passage of said feltable fibers and particles of said suspended solids smaller than said feltable fibers, and the foramens or openings through the second wall being dimensioned so that it will retain feltable fibers on its surface and so that it is capable of passing at least some of said smaller particles, constantly preventing fibers from being collected on the first wall to enable all said vehicular air to pass through both walls, dividing the material leaving the discharge side of the second wall into a solids-free air fraction at atmospheric pressure and a solids-containing fraction, mixing at least the solids of said solids-containing fraction with air from the atmosphere, and conveying the resulting mixture to the receiving side of said first wall.

19. The method of producing a fibrous structure comprising conveying suspended solids predominating in individualized feltable fibers through a foraminous first wall by vehicular air leaving said wall at superatmospheric pressure and travelling at high velocity into a region of subatmospheric pressure by movement to and through a foraminous second wall exposed to the atmosphere and closely spaced from the first wall, the vehicular air being in sufficient volume to prevent excessive contact between fibers as they travel between the first and second wall, the foramens or openings through the first wall being dimensioned to permit passage of said feltable fibers and particles of said suspended solids smaller than said feltable fibers, and the foramens or openings through the second wall being dimensioned so that it will retain feltable fibers on its surface and so that it is capable of passing at least some of said smaller particles, constantly preventing fibers from being collected on the first wall to enable all said vehicular air to pass through both walls, dividing the material leaving the discharge side of the second wall into a solids-free air fraction at atmospheric pressure and a solids-containing fraction, mixing at least the solids of said solids-containing fraction with air from the atmosphere, and conveying the resulting mixture to the receiving side of said first wall.

20. Apparatus for felting comprising a movable endless screen on which continuously to form a fiber felt at a stationary deposition area thereof exposed to the atmosphere, means providing suction under said screen and thereby defining said deposition area, a blower having its inlet connected to said suction means and its outlet arranged to discharge into a region at atmospheric pressure, dispersing means extending crosswise over the full width of the depositing area and positioned in spaced proximity to said area to disperse individualized fibers into the atmosphere toward and over the full extent of said deposition area and generally across the direction of movement of said screen said fibers being dispersed in a vehicle of air from a supply thereof in a region of superatmospheric pressure within said dispersing means, a second blower having its outlet connected to said region within said dispersing means and its inlet connected to draw air from a region at atmospheric pressure, said second blower in operation having less capacity for moving air than said first blower in simultaneous operation, means connected to the outlet of said first blower for separating a fraction containing solids from at least some of the air leaving said outlet, means for feeding at least the solids of said fraction into the inlet of the second blower, means to feed fibrous material for entry with air into said region within said dispersing means, and means continuously to move said screen.

21. The method of making a uniform fibrous web comprising the steps of maintaining an excess of dispersed material including essentially separated air entrained feltable fibers on one side of a foraminous surface and with the air under positive pressure whereby both fibers and air are caused to pass in substantially uniform concentrations through the foramens, drawing air through and said fibers onto a moving surface having relatively small foramens by maintaining a pressure below atmospheric pressure on the outgoing side thereof whereby the fibers are deposited on the ingoing side as an interfelted mass, maintaining the space between the surfaces open to the atmosphere, the air drawn through said moving surface consisting of a minor fraction from the atmosphere and a major fraction comprising all the air from the foraminous surface, whereby a slight inflow of air occurs from the surrounding atmosphere into and through the moving surface to prevent fibers from being blown out into the atmosphere and to effect an air-confined column of flowing air and fibers from the foraminous surface to the moving surface, dividing the material passing through said moving surface into the region of subatmospheric pressure on said outgoing side into an air fraction and a residue, mixing the said residue with air from the atmosphere, and conveying the resulting mixture to the region of said positive pressure on said one side of said foraminous surface.

References Cited in the file of this patent

UNITED STATES PATENTS

| | | |
|---|---|---|
| 1,336,402 | Weiss | Apr. 6, 1920 |
| 1,667,177 | Trout | Apr. 24, 1928 |
| 1,765,026 | Miller | June 17, 1930 |
| 1,786,669 | Manning | Dec. 30, 1930 |
| 1,970,742 | Gerard et al. | Aug. 21, 1934 |
| 2,020,319 | King | Nov. 12, 1935 |
| 2,152,901 | Manning | Apr. 4, 1939 |
| 2,193,263 | Avery | Mar. 12, 1940 |
| 2,236,472 | Freydberg et al. | Mar. 25, 1941 |
| 2,282,477 | Joa | May 12, 1942 |
| 2,336,745 | Manning | Dec. 14, 1943 |
| 2,389,024 | Brownlee | Nov. 13, 1945 |
| 2,544,019 | Heritage | Mar. 6, 1951 |
| 2,569,169 | Heritage | Sept. 25, 1951 |
| 2,577,784 | Lynam | Dec. 11, 1951 |
| 2,618,816 | Joa | Nov. 25, 1952 |
| 2,646,381 | Duvall | July 21, 1953 |